United States Patent [19]
Sakamoto et al.

[11] Patent Number: 4,782,275
[45] Date of Patent: Nov. 1, 1988

[54] REFERENCE POINT RETURN METHOD

[75] Inventors: Keiji Sakamoto, Tokyo; Yukio Toyosawa, Kumamoto, both of Japan

[73] Assignee: Fanuc Ltd., Minamitsuru, Japan

[21] Appl. No.: 130,993

[22] PCT Filed: Feb. 17, 1987

[86] PCT No.: PCT/JP87/00099
§ 371 Date: Oct. 14, 1987
§ 102(e) Date: Oct. 14, 1987

[87] PCT Pub. No.: WO87/05130
PCT Pub. Date: Aug. 27, 1987

[30] Foreign Application Priority Data
Feb. 19, 1986 [JP] Japan .................. 61-034880

[51] Int. Cl.$^4$ ............................ G05B 19/18
[52] U.S. Cl. .................. 318/569; 318/571; 318/572; 318/573; 364/167.01; 364/474.34
[58] Field of Search .......... 318/569, 571, 572, 573; 364/167, 474

[56] References Cited
U.S. PATENT DOCUMENTS
4,597,040  6/1986  Buizer ................... 364/170

Primary Examiner—William M. Shoop, Jr.
Assistant Examiner—Saul M. Bergmann
Attorney, Agent, or Firm—Staas & Halsey

[57] ABSTRACT

In reference point return control, a grid point position at which a one-revolution signal (RTS) is first generated by a rotary encoder (24) following restoration of a deceleration limit switch (29) is adopted as a reference point. When a zero point return mode (ZRN="1") for returning a movable element to the reference point is in effect, a numerical controller (21) regards the position at which the one-revolution signal (RTS) is generated by the rotary encoder (24) as being zero. A commanded position $REF_n$, until the next one-revolution signal is generated, is monitored at every predetermined time, such monitoring of the commanded position being repeated until the movable element arrives in the vicinity of the reference point. When the movable element approaches the reference point and the deceleration limit switch (29) is restored, the commanded position $REF_n$ at an initial time every $\Delta T$ is obtained, a distance $(N-REF_n)$ from the commanded position to the position at which the next one-revolution signal is generated is adopted as the final commanded amount of travel, and this is outputted to a digital servo-circuit (22) to return the movable element to the reference point. N is the distance between grid points.

4 Claims, 5 Drawing Sheets

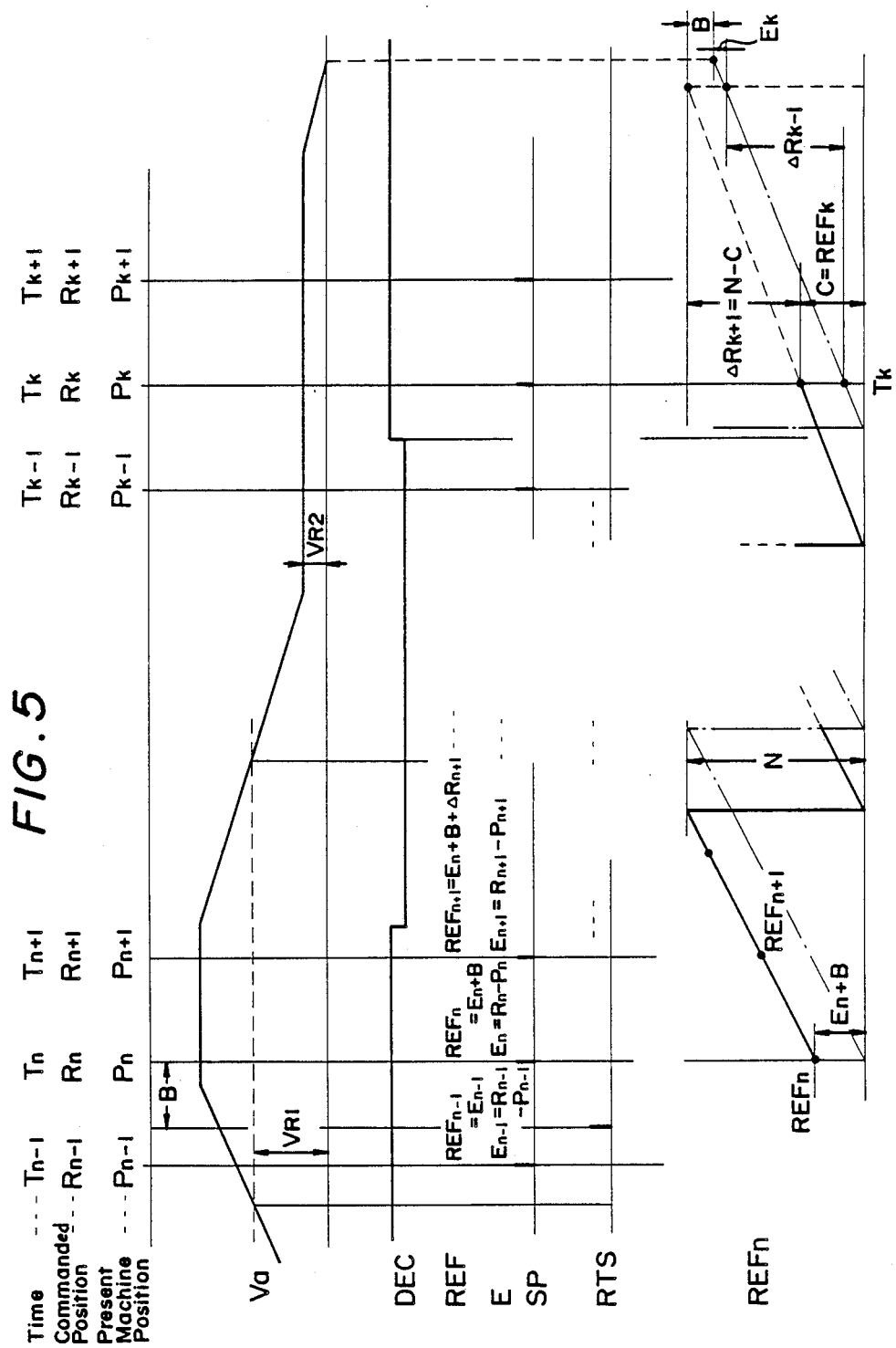

REFERENCE POINT RETURN METHOD

DESCRIPTION

Reference Point Return Method

BACKGROUND OF THE INVENTION

This invention relates to a reference point return method and, more particularly, to a reference point return method well-suited for use in performing a reference point return operation in a numerically controlled machine tool employing a digital servo-circuit for digitally generating a velocity command to transport a movable element.

In a numerically controlled machine tool, it is required that a movable element be returned to a predetermined reference point, thereby establishing coincidence between the machine position and a present position in a numerical controller before numerical control starts.

FIG. 1 is a block diagram of a section for practicing a conventional reference point return method, and FIG. 2 is the associated timechart.

If a move command is provided as NC data by an NC tape 10 when a reference point return command ZRN is "0" (i.e. when a reference point return mode is not in effect), a numerical controller 11 calculates, at every predetermined time, a minute traveling distance in the direction of each axis along which a movable element is to be transported during the predetermined time, and inputs the minute traveling distance to a pulse distributor for each axis for each predetermined time until the destination is reached. On the basis of the minute traveling distance inputted thereto, the pulse distributor 12 performs a pulse distribution calculation to generate command pulses $P_c$. An error counter 13 comprising a reversible counter counts the command pulses $P_c$. A DA converter, not shown, inputs a voltage proportional to the count to a velocity controller 14 as a velocity command, thereby rotating a servometer 15 to transport a movable element such as a tool or table, not shown.

A rotary encoder 16 is rotated by the rotation of the servometer. The rotary encoder 16 is adapted to generate a single feedback pulse $P_F$ whenever it rotates by a predetermined amount and to generate a one-revolution signal RTS whenever it makes one full revolution. Accordingly, the amount of rotation of the servometer 16 is detected by the rotary encoder 15 and is inputted to the error counter 13 as the feedback pulses $P_F$, thereby diminishing the contents of the counter in the zero direction. When a steady state prevails, the data (error) in the error counter 13 becomes substantially constant and the servometer 15 rotates at a substantially constant velocity. When the command pulses Pc stop arriving and the number of feedback pulses $P_F$ generated is equal to the number of command pulses, the data in the error counter 13 becomes zero and the servometer 15 stops rotating.

When the referenc point return command ZRN is "1" (i.e. when the reference point return mode is in effect), on the other hand, the numerical controller 11 calculates a minute traveling distance every predetermined time along each axis for transporting the movable element at a rapid-traverse velocity, and inputs these traveling distances to the pulse distributor 12, whereby the movable element is transported just as described above. It should be noted that the actual velocity $V_a$ at this time gradually rises to the rapid-traverse velocity $V_R$, as shown in FIG. 2.

A gate 17 is open at the start of reference point return. Therefore, the command pulses $P_c$ and the feedback pulses $P_F$ are inputted to a reference counter 18, just as to the error counter 13. The reference counter 18 is comprises a reversible counter and has a capcity N (equivalent to the number of feedback pulses $P_F$ generated during one revolution of the rotary encoder). The contents REF of the reference counter 18 agree with the contents (error) E of the error counter 13.

When the actual velocity $V_a$ exceeds a predetermined first reference velocity VR, the controller 11 generates a control signal D01. After the control signal D01 is generated, a gate control circuit 19 closes the gate 17 in response to generation of the first one-revolution signal RTS. Thereafter, the reference counter 18 counts up only the command pulses $P_c$, so that the contact REF thereof varies as shown in FIG. 2. A servo delay ($=E$) at time $T_0$ is set in the reference counter 18, after which the command pulses $P_c$ are counted. Therefore, the content REF can be regarded as a commanded position reset whenever the capacity N is reached. The actual machine position is as indicated by the one-dot chain line in FIG. 2.

When the movable element travels and depresses a deceleration limit switch provided in the vicinity of the reference point, a deceleration signal DEC assumes a low level ($=$"0"). As a result, the numerical controller 11 executes processing in such a manner that the traveling velocity of the movable element is slowed down to a second reference velocity VR2 (at time $T_1$), after which the movable element is moved at the velocity VR2.

As the movable element travels further at the low velocity and the deceleration limit switch is restored (time $T_2$), the numerical controller 11 generates the gate signal D02.

When a predetermined command pulse $P_c$ is subsequently generated, the movable element travels further and the counted value REF in the reference counter 18 becomes zero. As a result, the signal ZR becomes "1" ($T_3$), whereupon the gate 20 closes and the command pulses $P_c$ are no longer delivered.

Thereafter, the count in error counter 13 gradually diminishes, as a result of which the rotational velocity of the servometer 15 decreases. The count E in error counter 13 finally comes to rest at zero when the one-revolution signal RTS is generated.

In accordance with this conventional reference point return method, the return to the reference point can be performed accurately independently of the amount of delay. In addition, if a one-revolution position is referred to as a grid point, the movable element can be reference point-returned to the first grid point after the deceleration limit switch is restored. Morever, by presetting a numerical value M in the reference counter 18, a position displaced M pulses from the grid point position can be made the reference point-return position. Thus, the conventional method is a useful one.

There has been a recent trend toward digital control of servomotors. With such a digital servo, a traveling distance $\Delta R_n$ to be traveled along each axis every predetermined time $\Delta T$ (e.g. 2 msec) is calculated by a numerical controller. A value obtained by multiplying the traveling distance $\Delta R_n$ by a predetermined gain is inputted to a digital servo-circuit every predetermined time $\Delta T$, and the digital servo-circuit performs a calculation in accordance with the following equation every $\Delta T$:

$$E + \Delta R_n - \Delta P_n \rightarrow$$

(where $\Delta P_n$ is the actual traveling distance every $\Delta T$ and E a cumulative error whose initial value is zero) and executes pulse-width modulation in accordance with the size of the error E, thereby controlling the rotational velocity of the servomotor.

In other words, in the case of a digital servo, the pulse distributor 12 which generates the serial pulses is not provided, and the error counter is substituted by a RAM in the numerical controller 11.

A problem which results is that the conventional reference point return method cannot be applied to reference point return of a numerically controlled machine employing such a digital servo.

SUMMARY OF THE INVENTION

Accordingly, an object of the present invention is to provide a reference point return method applicable to reference point return of a numerically controlled machine tool employing a digital servo.

A numerical controller transports a movable element by rapid-traverse in response to a reference point return command. As a result, a rotary encoder generates a signal pulse whenever it rotates through a predetermined angle and a one-revolution signal whenever it makes one full revolution. It is assumed that the rotary encoder generates N-number of pulses during one revolution. A first counter counts the pulses generated by the rotary encoder during a predetermined time $\Delta T$, thereby monitoring the amount of travel $\Delta P_n$ of the movable element during this time. A second counter counts the number of pulses generated from generation of the one-revolution signal until an initial time every $\Delta T$, thereby monitoring the amount of travel B of the movable element during this time. At the initial time every $\Delta T$ after generation of the one-revolution signal, a sum $REF_n$ is calculated, this being the sum of an error $E_n$, which is the difference between a commanded position $R_n$ and the present machine position $P_n$ which actually prevails, and the amount of travel B obtained by the second counter. It should be noted that $REF_n$ is the commanded position when the position at which the one-revolution signal is generated is zero. Thereafter, $REF_n$ is updated every $\Delta T$ in accordance with the formula $$REF_n + \Delta R_n \rightarrow REF_n$$

until the next one-revolution signal is generated. The commanded position $REF_n$ at the initial time every $\Delta T$ after a deceleration limit switch is restored is obtained, $(N - REF_n)$ is outputted to a digital servo-circuit as the final commanded amount of travel, and the movable element is restored to a reference position determined to fall on a prescribed grid point.

BRIEF DESCRIPTION OF THE DRAWINGS

FIG. 5 is a time chart for describing the operation of FIG. 3.

DESCRIPTION OF THE PREFERRED EMBODIMENT

Figure 3:
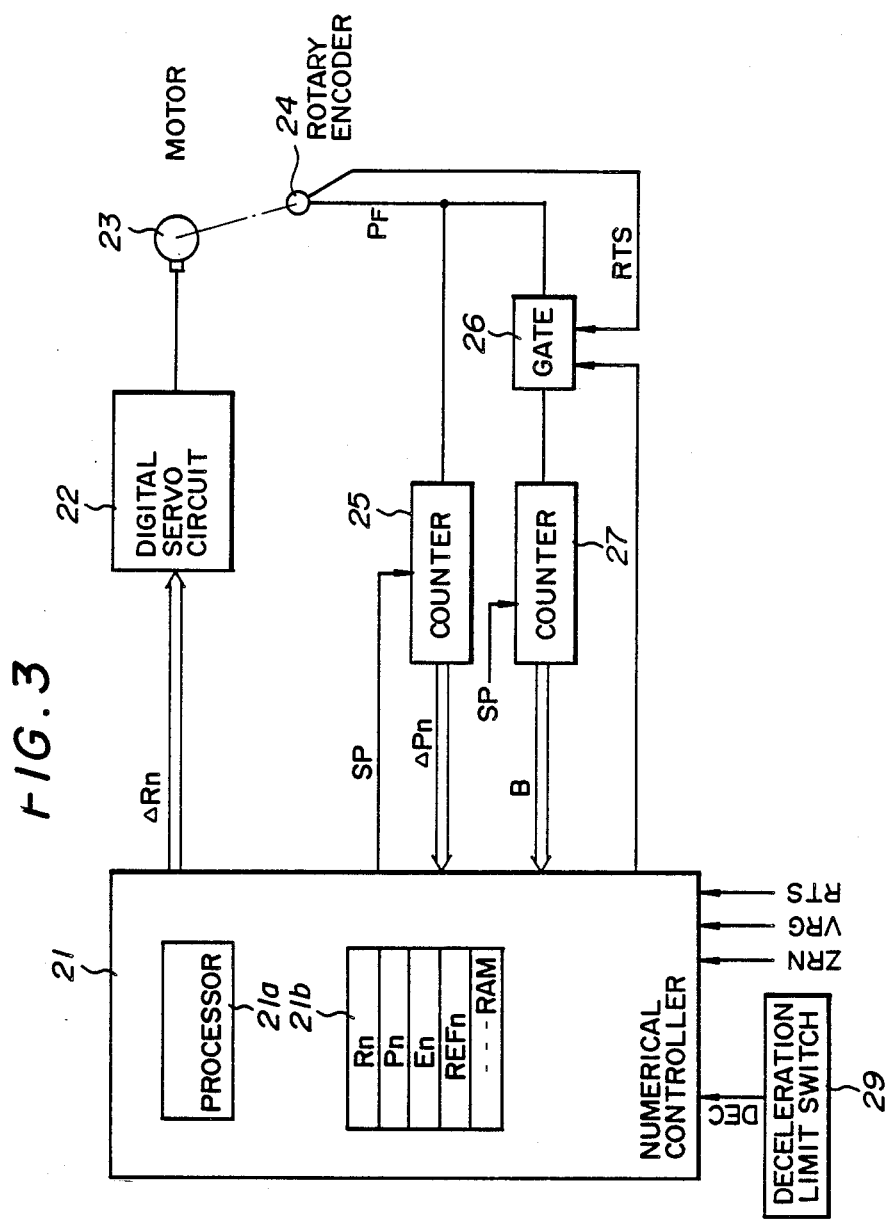
FIG. 3 is a block diagram of an apparatus for practicing the present invention.

FIG. 3 is a block diagram of an apparatus for practicing the present invention. In FIG. 3 numeral 21 denotes a computerized numerical controller for transporting a movable element such as a tool or table by generating a move command value $\Delta R_n$ at every predetermined time. Numeral 21a denotes a processor, and 21b a RAM. Numeral 22 designates a digital servo-circuit, 23 a servomotor, and 24 a rotary encoder for generating a pulse $P_F$ whenever the movable element travels a predetermined distance as well as a one-revolution signal RTS every revolution, or in other words, whenever a predetermined amount (N) of the pulses $P_F$ are generated. Numeral 25 represents a first counter which counts the pulses $P_F$ in a predetermined time $\Delta T$, thereby monitoring the amount of travel $\Delta P_n$ of the movable element during this time. Numeral 26 denotes a gate, and 27 a second counter which counts the number of pulses $P_F$ produced from generation of the one-revolution signal RTS until an initial time every predetermined time, thereby monitoring the amount of travel B of the movable element during this time. Numeral 29 represents a deceleration limit switch provided in the vicinity of a reference point.

Figure 4:
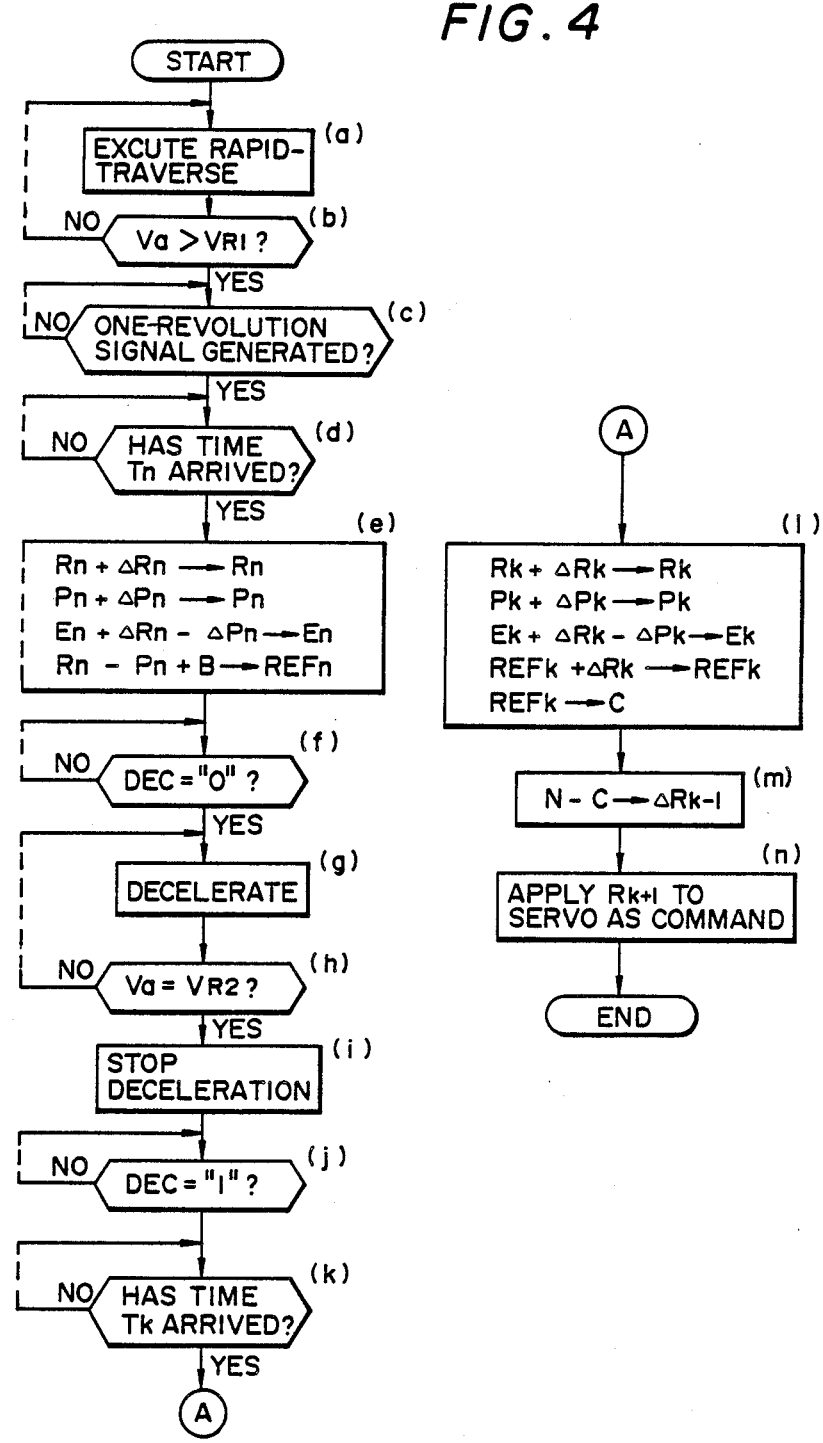
FIG. 4 is a flowchart of processing according to the invention.

FIG. 4 is a flowchart of processing in the reference point return method of the present invention, and FIG. 5 is a time chart. Reference point return processing according to the invention will now be described in accordance with FIGS. 3 through 5. It is assumed that the processor performs predetermined processing every $\Delta T$ (e.g. 2 msec). Further, let a commanded position at each time $T_n$ (n = 1, 2, . . . ) be expressed by $R_n$, the present machine position by $P_n$, and an error by $E_n$ ($= R_n - P_n$). Also, let a commanded position when the position at which the one-revolution signal is generated be expressed by $REF_n$.

(a) When a reference point return operation is requested (ZRN = "1") from an operator's panel, not shown, the processor 21a of the numerical controller 21 calculates a minute traveling distance $\Delta R_n$ every predetermined time $\Delta T$ (2 msec) along each axis for transporting the movable element at a rapid-traverse velocity, multiplies the traveling distance by a prescribed gain an inputs the result to the digital servo-circuit 22, whereby the servomotor 23 is rotated to transport the movable element.

Until a step (d) described below is executed, the processor 21a of the numerical controller 11 executes the following calculations every $\Delta T$ (2 msec) in concurrence with the processing illustrated in the flowchart of FIG. 4:

$$R_n + \Delta R_n \rightarrow R_n \qquad (1)$$

$$P_n + \Delta P_n \rightarrow P_n \qquad (2)$$

$$E_n + \Delta R_n - \Delta P_n \rightarrow E_n \qquad (3)$$

$$R_n - P_n \rightarrow REF_n \qquad (4)$$

thereby obtaining the commanded position $R_n$, the present machine position $P_n$, the error $E_n$ (the initial value of which is zero), and $REF_n$. These are stored in the RAM 11b.

Figure 1:
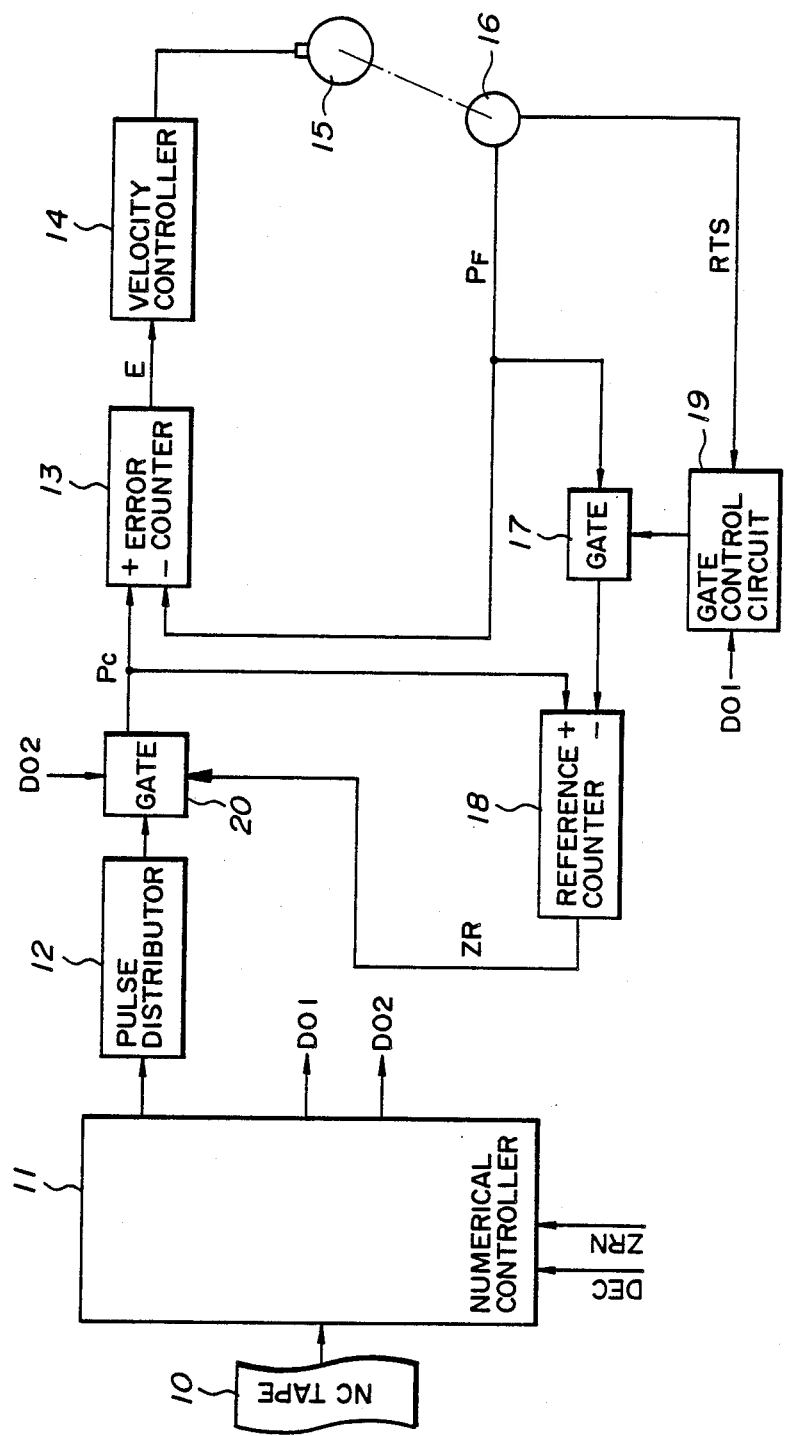
FIG. 1 is a block diagram of the conventional apparatus.
Figure 2:
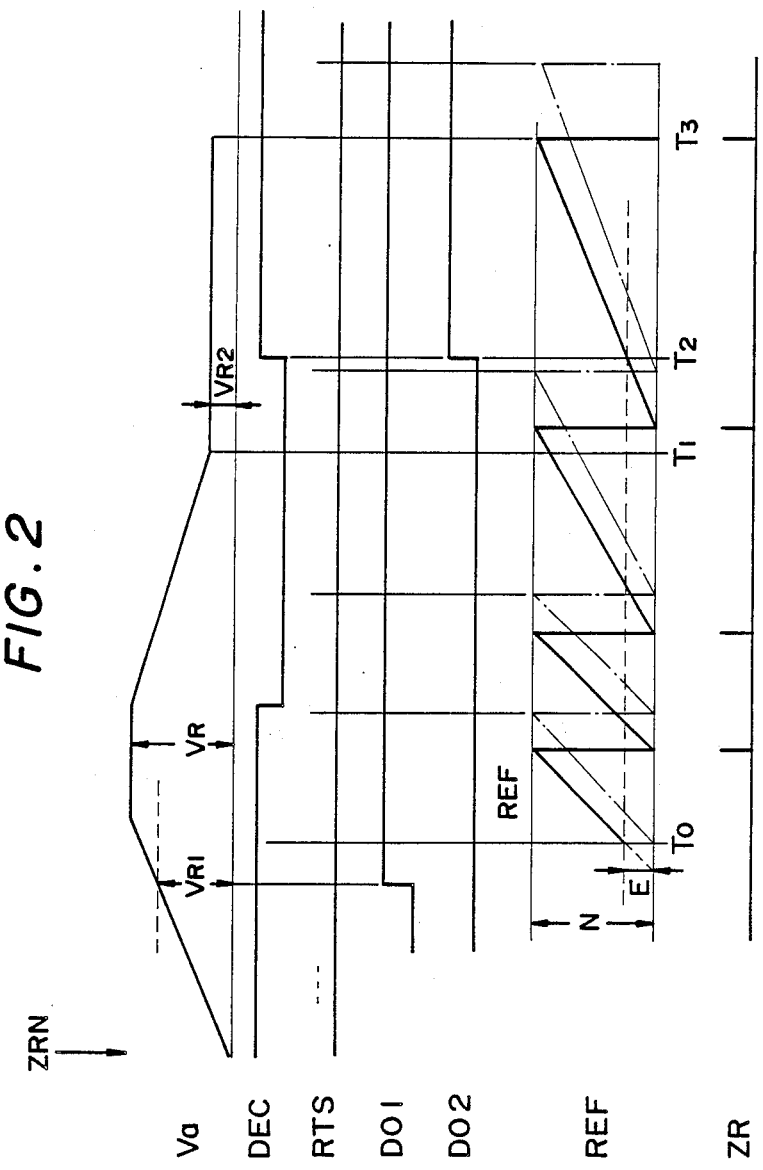
FIG. 2 is a time chart for describing the operation of FIG. 1.

$REF_n$ corresponds to the count in reference counter 18 in the example of FIG. 1. Furthermore, $\Delta P_n$ in the above equations is the actual traveling distance occurring during each $\Delta T$. The feedback pulses $P_F$ are counted by the counter 25, and the processor 1a reads the count and resets the counter to zero every $\Delta T$, after which the feedback pulses are again counted starting from zero, whereby $\Delta P_n$ is obtained.

(b) The actual velocity $V_a$ gradually increases due to the above-described control, and the processor 21a checks whether the actual velocity $V_a$ has exceeded a predetermined first reference velocity VR1.

(c) If $V_a \geq VR1$ holds, then a velocity monitor, not shown, generates a high-level (="1") velocity attainment signal VRG, as a result of which the processor 21a next checks whether the one-revolution signal RTS has been generated.

(d) If the one-revolution signal RTS is generated, it is determined whether an initial time $T_n$ within each $\Delta T$ has occured. Note that if the one-revolution signal RTS is generated, the gate 26 opens until the initial time $T_n$ occurs during the current $\Delta T$, so that the feedback pulses $P_F$ generated by the rotary encoder 24 are applied to the counter 27 to be counted thereby. Thus, the amount of travel B (see FIG. 5) covered from generation of the one-revolution signal RTS until the initial time $T_n$ occurring during each $\Delta T$ is stored in the counter 27.

(e) At time $T_n$, the processor 21a generates a sampling pulse SP, reads the amount of travel B stored in counter 27 and, in similar fashion, reads the amount of travel $\Delta P_n$, that occurred during the time $\Delta T$, stored in the counter 25. Thereafter, the processor executes the operations of Eqs. (1) through (3) to calculate the commanded position $R_n$, present machine position $P_n$ and error $E_n$, and calculates $REF_n$ in accordance with the formula $$R_n - P_n + B \rightarrow REF_n \qquad (5)$$

Note that $REF_n$ is the commanded position at time $T_n$ when the position at which the one-revolution signal RTS is generated is zero (i.e. the commanded position every single revolution). The actual present machine position is delayed from $REF_n$ by $(R_n - P_n + B)$.

(f) Next, the processor 21a checks whether a deceleration signal DEC is "0", brought about by the movable element depressing the deceleration limit switch 29.

Until a step (k) described below is executed, the processor 21a executes the calculations of Eqs. (1) through (3) every $\Delta T$ in concurrence with the processing illustrated in the flowchart of FIG. 4 to calculate the command position $R_n$, present machine position $P_n$ and error $E_n$, and updates the commanded position $REF_n$ every revolution in accordance with the equation $$REF_n + \Delta R_n \rightarrow REF_n \qquad (6)$$

or, if $(REF_n + \Delta R_n)$ is greater than N, $$REF_n + \Delta R_n - N \rightarrow REF_n \qquad (6')$$

That is, the commanded position $REF_n$ when the position at which the one-revolution signal is generated is zero varies as shown in FIG. 5 by having the commanded traveling distance $\Delta R_n$ added thereto every $\Delta T$. The present machine position is indicated by the one-dot chain line.

(g) When the movable element travels in the direction of the reference point and the deceleration limit switch 29 provided in the vicinity of the reference point is depressed by the movable element, the deceleration signal DEC becomes "0". When this occurs, the processor 21a performs deceleration processing. That is, the processor successively decreases the commanded amount of movement $\Delta R_n$ every $\Delta T$.

(h) The processor subsequently checks whether the actual velocity $V_a$ has attained a second reference velocity VR2.

(i) If $V_a = VR2$ holds, deceleration processing is halted. As a result, the movable element subsequently moves in the direction of the reference point at the abovementioned velocity.

(j) The processor 21a then checks whether the deceleration signal DEC has attained the value "1".

(k) When the movable element travels further in the direction of the reference point, the deceleration limit switch 29 being depressed by the movable element is restored, so that the deceleration signal DEC changes from "0" to "1".

When the condition DEC="1" is attained, it is checked whether an initial time $T_k$ every $\Delta T$ has arrived.

(l) If time $T_k$ has arrived, the processor executes Eqs. (1) through (3) and Eq. (6) or (6)'(the operation n→k is performed in each equation) to calculate a commanded position $R_k$, a present machine position $P_k$, an error $E_k$ and a commanded position $REF_k$ which prevails when the position at which the one-revolution signal is generated is zero. Further, the operation $REF_k \rightarrow C$ (see FIG. 5) is performed.

(m) Next, in accordance with the following equation, the processor 21a calculates an amount of travel $\Delta R_{k+1}$ necessary to make the commanded position the position at which the one-revolution signal is generated:

$$N - C \rightarrow \Delta R_{k+1} \qquad (7)$$

In other words, a commanded amount of travel $\Delta R_{k+1}$ needed to position the movable machine element at the position where the one-revolution signal is generated is calculated. The commanded position is updated in accordance with Eq. (1).

(n) Thereafter, 66 $R_{k+1}$ is outputted to the digital servo-circuit 22 as the final commanded amount of travel. As a result, the movable element is moved $(\Delta R_{k+1} + E_k)$ from time $T_k$ and is stopped upon reaching the position at which the one-revolution signal is generated. The reference point return operation is then ended.

Thus, in accordance with the present invention, a reference point return operation can be performed by software processing within a computerized numerical controller. Consequently, the invention is well-suited for application to reference point return in a numerically controlled machine tool employing a digital servo-circuit.

We claim:

1. A reference point return method in a numerical control system having: a computerized numerical controller for generating a move command value $\Delta R_n$ at predetermined time intervals $\Delta T$, a digital servo-circuit for digitally servo-controlling a servomotor on the basis of the move command value $\Delta R_n$ to transport a movable element, pulse generating means for generating a pulse whenever the servomotor rotates a predetermined amount and for generating a one-revolution signal whenever a predetermined amount of the pulses (N) are generated, first counting means for counting the pulses generated during the predetermined time interval so as to monitor an amount of travel $\Delta P_n$ of the movable element during the predetermined time interval, second counting means for counting the pulses from generation of the one-revolution pulse until an initial one of the predetermined time intervals so as to monitor an amount of travel B of the movable element during the predetermined time interval, and a deceleration limit switch with normal and depressed states, said method comprising the steps of:

(a) generating a reference point return command;
(b) transporting the movable element in accordance with the reference point return command;
(c) providing a command position $R_n$ at an initial time within each of the predetermined time intervals;
(d) monitoring a present position $P_n$ of the movable element;
(e) obtaining an error $E_n$, which is the difference between (a) the commanded position $R_n$ and the present machine position $P_n$;
(f) obtaining a value $REF_n$ corresponding to the sum of the error $E_n$ and the amount of travel B;
(g) setting the commanded position to $REF_n$ during the predetermined time interval when the position at which the one-revolution signal is generated is zero;
(h) updating $REF_n$ during each of the predetermined time intervals in accordance with the formula $$REF_n + \Delta R_n \rightarrow REF_n$$

(i) detecting a depressed state of the deceleration limit switch and the switch being restored from the depressed state; and
(j) outputting, as a final commanded amount of travel, $\Delta R_n$ obtained in accordance with the formula $$(N - REF_n) \rightarrow \Delta R_n$$

using a commanded position $REF_n$ at an initial time after the deceleration limit switch is restored from the depressed state.

2. A reference point return method according to claim 1, wherein the commanded position $R_n$ is updated in accordance with the formula $$R_n + \Delta R_n \rightarrow R_n$$

and the present position Pn is updated in accordance with the formula $$P_n + \Delta P_n \rightarrow P_n.$$

3. A reference point return method according to claim 1, wherein $REF_n$ is updated in accordance with the following formula when $REF_n + R_n \geq N$ holds:

$$REF_n + \Delta R_n - N \rightarrow REF_n.$$

4. A reference point return method according to claim 1, further comprising the step of:
detecting an actual velocity of the movable element, and wherein
processing from step (e) onward is executed following generation of a one-revolution signal which occurs first after actual velocity exceeds a predetermined velocity.

* * * * *